United States Patent [19]

Merritt

[11] 4,227,907
[45] Oct. 14, 1980

[54] LASER PHOTOCHEMICAL SYNTHESIS COATING OF OPTICAL FIBER

[75] Inventor: James A. Merritt, Pulaski, Tenn.

[73] Assignee: The United States of America as represented by the Secretary of the Army, Washington, D.C.

[21] Appl. No.: 87,115

[22] Filed: Oct. 22, 1979

[51] Int. Cl.³ .............................................. C03C 25/02
[52] U.S. Cl. .......................................... 65/3 R; 65/2; 65/3 C; 65/30 R; 427/163
[58] Field of Search .................. 65/2, 3 R, 3 A, 30 R; 427/163

[56] References Cited

U.S. PATENT DOCUMENTS 4,118,211  10/1978  Coin ........................................ 65/3 R Primary Examiner—Robert L. Lindsay, Jr.
Attorney, Agent, or Firm—Nathan Edelberg; Robert P. Gibson; Jack W. Voigt

[57] ABSTRACT

Disclosed is a method to prepare and coat an optical fiber with $Si_3N_4$. The $Si_3N_4$ is synthesized from $SiF_4+NH_3$ and/or $SiH_4+NF_3$ by laser photochemical reaction (LPR) techniques in a controlled atmosphere chamber. The silicon fiber which is a representative optical fiber is drawn from a preform at about 2000° C. in a standard fiber drawing furnace. Immediately after drawing of fiber, the fiber is passed through a chamber with a controlled atmosphere containing $SiX_4$ and $NX_3$ gases, wherein X equals hydrogen or fluorine. A laser is used to irradiate the atmosphere and the $Si_3N_4$ is coated on the optical fiber to a thickness of about 0.02–0.20 micrometer which hermetically seals the fiber and enhances and maintains the mechanical strength thereof.

2 Claims, No Drawings

LASER PHOTOCHEMICAL SYNTHESIS COATING OF OPTICAL FIBER

DEDICATORY CLAUSE

The invention described herein may be manufactured, used, and licensed by or for the Government for governmental purposes without the payment to me of any royalties thereon.

BACKGROUND OF THE INVENTION

The mechanical strength of optical fibers in excess of $2 \times 10^5$ psi is a desirable feature for certain specialized application (e.g., optical waveguides employing lengths of fiber).

Lack of mechanical strength is due to submicron flaws in the surface attributed, mainly, to chemical attack by atmospheric contaminants (e.g., moisture) during and after fiber drawing. Attempts to solve these problems have been studied by applying organic coatings to the fiber following the drawing of the fiber. Failure resulted because those organic coatings are not impervious to moisture or hydroxyl penetration. The penetration by moisture or hydroxyl resulted in reduced strength of the coated fiber during periods of storage and/or use.

Silicon nitride ($Si_3N_4$) is an appropriate coating since it is resistant to moisture penetration and bonds securely to the silicon substrate fiber. Previous attemps to clad silicon fibers with $Si_3N_4$ uses thermal (pyrolysis) techniques.

Thermal (pyrolysis) methods of influencing chemical processes lead, mainly, to the excitation of all degrees of freedom of the molecule. Both external (translational) and internal (electronic, vibrational and rotational) degrees of freedom are usually in thermodynamic equilibrium. In addition to there being an unproductive waste of energy, reactions with equilibrium excited molecules characteristically proceed in the direction of breaking the weakest bond, have a considerable percent of back reaction, many side reactions, and produce polymers.

Advantageous would be a method which employs laser photochemical reactions (LPR) to produce silicon nitride to clad freshly-drawn silicon fibers in an atmospheric controlled chamber. A particular advantage is recognized over the prior art vapor deposition method since the LPR method can be effected at room temperature.

An object of this invention to provide a method of coating optical fibers with $Si_3N_4$ produced by laser photochemical reactions.

Another object of this invention is to deposit $Si_3N_4$ on freshly-drawn silicon optical fibers in an atmospheric controlled chamber in a continuous operation which employs $SiF_4$ and $NH_3$ as the reaction gases.

A further object of this invention is to deposit $Si_3N_4$ on freshly-drawn silicon optical fibers in an atmospheric controlled chamber in a continuous operation which employs $SiH_4$ and $NF_3$ as the reaction gases.

SUMMARY OF THE INVENTION

Freshly-drawn silicon optical fibers in an atmospheric controlled chamber are coated with $Si_3N_4$ by laser photochemical reactions which are initiated in accordance with the following equation:

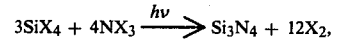

$$3SiX_4 + 4NX_3 \xrightarrow{h\nu} Si_3N_4 + 12X_2,$$

wherein X is H and/or F when reaction is initiated by a $CO_2$ laser.

DESCRIPTION OF THE PREFERRED EMBODIMENT

A silicon optical fiber is hermetically sealed by cladding with $Si_3N_4$ synthesized by laser photochemical reactions initiated on the gases $SiX_4$ and $NX_3$ in a controlled atmosphere.

The silicon optical fiber is prepared in a standard fiber drawing furnace from a preform rod of fused silica which is brought to its yield point at about 2000° C. The silicon fiber is drawn from the preform and through a chamber with controlled atmosphere ($SiX_4$ and $NX_3$ gases, wherein X is hydrogen and/or fluorine) at room temperature. The laser is used to irradiate this atmosphere to form $Si_3N_4$ which is coated on the silicon optical fiber to a thickness of about 0.02–0.20 micrometer.

The laser photochemical reaction initiated by the process of this invention when conducted in the presence of other substrates; e.g., other than optical fibers such as rocket motor nozzles or other components is effective in providing a coating of $Si_3N_4$ on the substrates at room temperature (about 25° C.). This method permits coating other materials which could not withstand high temperature conditions employed by vapor deposition method. A pressure between about 10 and 200 torr of the reactive gases is satisfactory for coating the silicon optical fiber with the reaction product, $Si_3N_4$. The thickness of the coating is proportionate to the flow rate of the reactants through the reaction chamber.

The laser photochemical reaction initiated by the process of this invention is an effective method for producing the compound $Si_3N_4$ at room temperature. For this particular method the laser photochemical synthesis can be carried out by employing a pulsed laser or a continuous wave laser. The laser radiation is directed through a salt window into a controlled atmosphere of $SiX_4$ and $NX_3$, wherein X is selected from hydrogen and/or fluorine. For example $Si_3N_4$ is synthesized from $SiF_4+NH_3$ and/or $SiH_4+NF_3$ at room temperature in either a batch process or in a continuous flowing process. The product is separated as a solid powder in high yield by using a cold finger or scraping the solid powder from reaction chamber surfaces. The laser photochemical synthesis is illustrated as follows:

$$3SiX_4 + 4NX_3 \xrightarrow{h\nu} Si_3N_4 + 12X_2.$$

I claim:

1. In a method of producing an optical fiber of high mechanical strength from a high purity fused silica preform rod wherein the preform rod is heated to its yield point at about 2000° C., a fiber is drawn from the heated preform, and the drawn fiber is immediately hermetically sealed with a layer of silicon nitride of about 0.02 to about 0.20 micrometer thickness, the improvement in said method of hermetically sealing the drawn fiber at room temperature by a laser photochemical reaction process which comprises:

(a) placing a drawn silicon fiber in a reaction chamber provided with a salt window transparent to laser radiation;
(b) introducing and maintaining a controlled atmosphere of $SiX_4$ and $NX_3$ gases, wherein X is selected from hydrogen and fluorine, in said reaction chamber and;
(c) irradiating said controlled atmosphere with a predetermined wavelength of a laser to produce $Si_3N_4$ which coats and hermetically seals said drawn silicon fiber with a layer of said $Si_3N_4$ of about 0.02 to about 0.20 micrometer thickness.

2. The method of hermetically sealing a drawn silicon fiber as disclosed by claim 1 wherein said laser photochemical reaction process employs the predetermined wavelength corresponding to the P(36) line of a $CO_2$ laser, said P(36) line being in resonance with a fundamental band centered at about 1031.8 cm$^{-1}$ of said $SiX_4$, wherein X equals fluorine, and wherein said $SiX_4$ and $NX_3$ gases undergo photochemical reactions initiated by said laser line to produce said $Si_3N_4$ which coats and hermetically seals at room temperature said drawn silicon fiber with said layer of $Si_3N_4$.

* * * * *